US012679639B2

(12) United States Patent
Alhashim et al.

(10) Patent No.: US 12,679,639 B2
(45) Date of Patent: Jul. 14, 2026

(54) RECTANGULAR WASTE BIN LID FOR RECTANGULAR WASTE BINS

(71) Applicant: IMAM ABDULRAHMAN BIN FAISAL UNIVERSITY, Dammam (SA)

(72) Inventors: Zainab Alhashim, Saihat (SA); Noran Kattan, Dammam (SA); Akehlah Alsadiq, Dammam (SA); Khadijah Al Khuwaitem, Dammam (SA)

(73) Assignee: IMAM ABDULRAHMAN BIN FAISAL UNIVERSITY, Dammam (SA)

( * ) Notice: Subject to any disclaimer, the term of this patent is extended or adjusted under 35 U.S.C. 154(b) by 36 days.

(21) Appl. No.: 19/013,523

(22) Filed: Jan. 8, 2025

(65) Prior Publication Data

US 2026/0193027 A1 Jul. 9, 2026

(51) Int. Cl.
*B65F 1/16* (2006.01)

(52) U.S. Cl.
CPC .......... *B65F 1/1623* (2013.01); *B65F 1/1646* (2013.01); *B65F 2001/1676* (2013.01); *B65F 2210/167* (2013.01)

(58) Field of Classification Search
CPC .................. B65F 1/1623; B65F 1/1646; B65F 2001/1676; B65F 2210/167
USPC ................... 220/254.2, 254.5, 825, 826, 908
See application file for complete search history.

(56) References Cited

U.S. PATENT DOCUMENTS 2,765,948 A * 10/1956 Paley ................. B60K 15/0406 220/254.5
3,675,810 A * 7/1972 Ross, Jr. ................... B65F 1/08 220/837
4,679,700 A * 7/1987 Tharrington .......... B65F 1/1607 232/1 R (Continued)

FOREIGN PATENT DOCUMENTS

GB 2487219 A 7/2012
WO 2023/200193 A1 10/2023

OTHER PUBLICATIONS

"CZC Auto Car Trash Can/Bin Leakproof Car Garbage Bin with Lid and Storage Pockets, Collapsible/Foldable Auto Trash Bin 2.3 Gallon Hanging Car Waste Bin with Adjustable Strap for Vehicle Organizing", CZC Auto, Jul. 23, 2021, 4 pages.

(Continued)

*Primary Examiner* — James N Smalley
(74) *Attorney, Agent, or Firm* — Oblon, McClelland, Maier & Neustadt, L.L.P.

(57) ABSTRACT

A rectangular lid for a waste bin includes a rectangular lower support to attach to the waste bin, a rectangular upper support, and a center expandable section attaching the two supports and including pleats to move the rectangular upper support upward when waste within the waste bin exceeds its height. First and second pairs of opposing slots are formed at opposing ends of the rectangular upper support, with first and second hinge pins configured to pass through these slots. A first panel with a first plurality of hinges receives the first hinge pin, while a second panel with a first plurality of hinges receives the second hinge pin. The panels form a closed disposal door in an undeployed configuration and rotate inward to receive waste in a deployed configuration, returning to the undeployed configuration after waste reception.

20 Claims, 7 Drawing Sheets

(56) References Cited

U.S. PATENT DOCUMENTS

| | | | | |
|---|---|---|---|---|
| 5,244,109 | A | 9/1993 | Mullett et al. | |
| 8,028,854 | B2 * | 10/2011 | Sofy | B65F 1/1607 220/825 |
| 8,348,081 | B2 * | 1/2013 | Baptiste | B65F 1/1468 220/908 |
| 8,453,864 | B2 * | 6/2013 | Krueger | A47G 19/30 220/370 |
| 8,556,100 | B2 | 10/2013 | Austin et al. | |
| 11,097,894 | B2 * | 8/2021 | Ophardt | B65F 1/1623 |
| 2019/0322418 | A1 | 10/2019 | Henriques et al. | |

OTHER PUBLICATIONS

"Indoor 50 litre semi circular, half moon flat back shaped, kitchen motion sensor food waste rubbish bins with self opening & closing lids. This automatic trash garbage storage bin opens sideways, swing out action, hence fits under any counter top, worktop surface", Autobin, Jan. 15, 2020, 4 pages.

* cited by examiner

RECTANGULAR WASTE BIN LID FOR RECTANGULAR WASTE BINS

CROSS REFERENCE TO RELATED APPLICATIONS

The present application is related to "Round Waste Bin Lid For Domestic Waste Bins" application Ser. No. 18/974,539, filed on Dec. 9, 2024, which is incorporated herein by reference in its entirety.

STATEMENT OF ACKNOWLEDGEMENT

Financial support provided by the King Fahd University of Petroleum and Minerals (KFUPM), Riyadh, Saudi Arabia through Project No. EC221008 is gratefully acknowledged.

BACKGROUND

Technical Field

The present disclosure is directed to waste management systems and equipment, and more particularly to expandable rectangular waste bin covers having self-closing disposal doors that facilitate safe and efficient waste disposal.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The proper management of waste is an important task for maintaining a clean and healthy environment. Domestic waste, generated from households and residential areas, constitutes a significant portion of the total waste stream. The collection and disposal of domestic waste are essential aspects of waste management systems. Domestic waste bins are commonly used for the temporary storage and collection of household waste. These waste bins are typically placed in designated areas for collection by waste management services. Waste collection in urban and residential areas typically involves manual handling of waste bins by collection workers. These waste bins are generally equipped with basic hinged or removable covers intended to contain waste and prevent spillage during storage periods.

However, conventional waste bins often present challenges in terms of capacity limitations, accessibility, and safety concerns. Standard waste bins typically have a fixed capacity, which can be insufficient during periods of high waste generation. This can lead to overfilling of bins, resulting in spillage, foul odors, and potential health hazards. Additionally, conventional waste bins may not be easily accessible for waste disposal, especially for elderly individuals or those with physical limitations. Furthermore, manual handling of waste bins presents safety risks as a substantial number of workers sustain injuries from sharp objects, overflowing waste, and hazardous materials during collection activities. These injuries often occur when workers need to interact directly with waste materials or when dealing with overfilled containers.

Conventional approaches to these challenges include basic safety equipment for workers, standard bin covers with simple hinged mechanisms, and fixed-capacity containers.

Some waste bins utilize basic expansion mechanisms or overflow indicators to address capacity issues. However, these conventional solutions have significant limitations. Fixed-capacity bins often lead to overflow situations, forcing waste to be placed outside containers. Simple hinged covers do not prevent waste collector exposure to potentially hazardous materials during collection. Additionally, current designs typically lack mechanisms to accommodate varying waste volumes while maintaining safe operation, leading to increased risk of worker injury and environmental contamination.

Accordingly, it is one object of the present disclosure to provide a rectangular waste bin cover that addresses these limitations by incorporating an expandable section for increased capacity, at least one handle for secure grip, and a sealable door configured to open and close to receive waste. The waste bin cover of the present disclosure is designed to be adaptable to various bin sizes, enhancing both safety and user-friendliness in the handling of domestic waste.

SUMMARY

In an exemplary embodiment, a rectangular lid for a waste bin is described, comprising: a rectangular lower support configured to attach to the waste bin; a rectangular upper support comprising a disposal door configured to receive the waste; a center expandable section configured to attach to the rectangular lower support and the rectangular upper support, wherein the center expandable section includes pleats which are configured to open to permit the rectangular upper support ring to move upward when an amount of waste within the waste bin exceeds a height of the waste bin; a first pair of opposing slots located at a first end of the rectangular upper support; a second pair of opposing slots located at a second end of the rectangular upper support; a first hinge pin configured to pass through the first pair of opposing slots; a second hinge pin configured to pass through the second pair of opposing slots; a first panel configured with a first plurality of hinges located along a first edge, wherein the first plurality of hinges of the first panel are configured to receive the first hinge pin; and a second panel configured with a first plurality of hinges located along a first edge, wherein the first plurality of hinges of the second panel are configured to receive the second hinge pin, wherein the first panel and the second panel are configured to form a closed disposal door in an undeployed configuration and to rotate inward to receive the waste in a deployed configuration, wherein the first panel and the second panel are configured to return to the undeployed configuration after the waste is received within the waste bin.

In another exemplary embodiment, a method for assembling an expandable rectangular lid for a rectangular waste bin is described, comprising: connecting an outer edge of a rectangular lower support to an outer edge of a rectangular upper support by a pleated center expandable section comprising a synthetic leather; connecting a plurality of telescopic supports at a first end to a top surface of the rectangular lower support and at a second end to a bottom surface of the rectangular upper support; drilling a first pair of opposing slots in a first end of the rectangular upper support; drilling a second pair of opposing slots in a second end of the rectangular upper support; connecting a first panel to the first end of the rectangular upper support by connecting a first wing of a first plurality of spring loaded hinges of the first panel to the first end of the rectangular upper support and connecting a second wing of the first plurality of spring loaded hinges of the first panel to an underside of a first panel; inserting a first hinge pin through the first pair of opposing slots and through a spring loaded barrel of the each of the first plurality of spring loaded hinges; connecting a second panel to the second end of the rectangular upper support by connecting a first wing of a first plurality of spring loaded hinges of the second panel to the second end of the rectangular upper support and connecting a second wing of the first plurality of spring loaded hinges of the second panel to an underside of the second panel; inserting a second hinge pin through the second pair of opposing slots and through a spring loaded barrel of the each of the first plurality of spring loaded hinges of the second panel; holding, by the first plurality of spring loaded hinges of the first panel and the second plurality of spring loaded hinges of the second panel, the first panel and the second panel respectively in an undeployed configuration which forms a closed disposal door; rotating inward, by the first plurality of spring loaded hinges of the first panel and the second plurality of spring loaded hinges of the second panel, the first panel and the second panel respectively in a deployed configuration which permits the insertion of an amount of waste through the disposal door, wherein the first plurality of spring loaded hinges of the first panel and the second plurality of spring loaded hinges of the second panel are configured to return the first panel and the second panel respectively to the undeployed configuration after the amount of waste is received within the waste bin; and moving the rectangular upper support vertically by expanding the pleats of the pleated center expandable section by an upward pressure formed by the amount of waste in the rectangular waste bin when the amount of waste exceeds a height of the rectangular waste bin.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
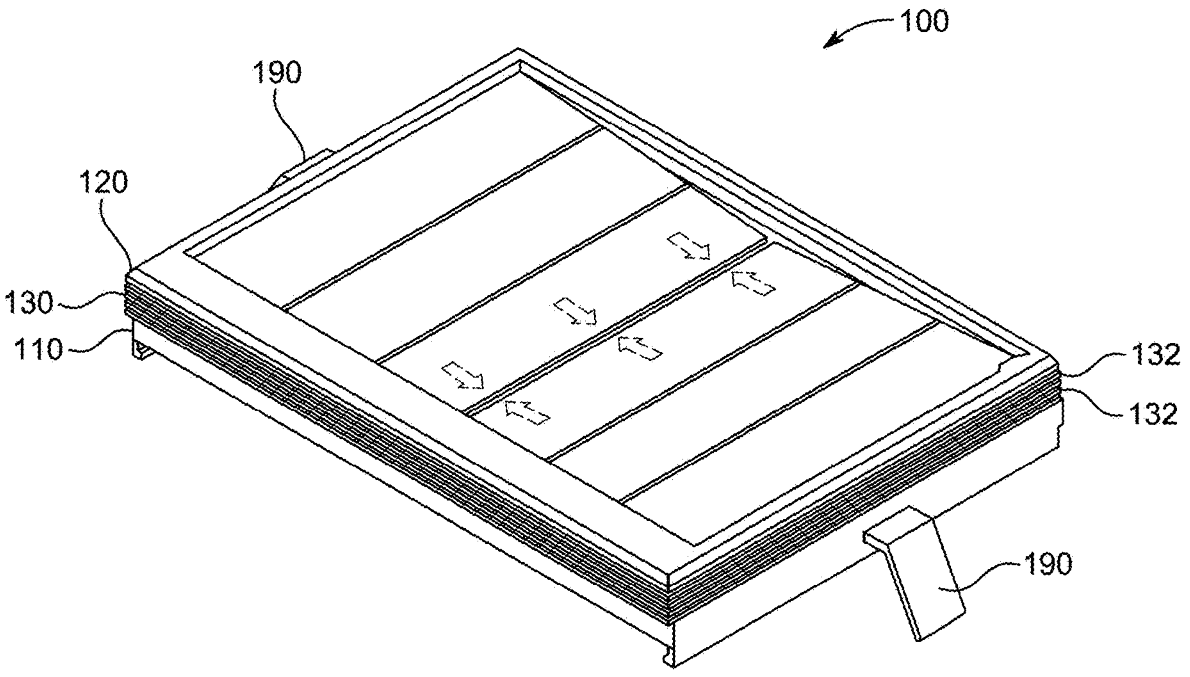
FIG. 1A is an exemplary perspective diagram of a rectangular lid, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a rectangular lid and a method for assembling the expandable rectangular lid for a rectangular waste bin. The rectangular lid of the present disclosure incorporates features that work in conjunction to prevent waste overflow, minimize direct contact with waste materials during collection, and ensure reliable operation in various environmental conditions. Unlike conventional waste bin covers, which often have fixed capacities and lack user-friendly features, the present rectangular lid is expandable and can self-adjust to accommodate varying waste volumes rectangular lid while maintaining secure closure through its hinged panel system. This adaptability ensures that the rectangular lid of the present disclosure can effectively manage waste during peak generation periods, preventing overfilling and spillage.

Figure 1B:
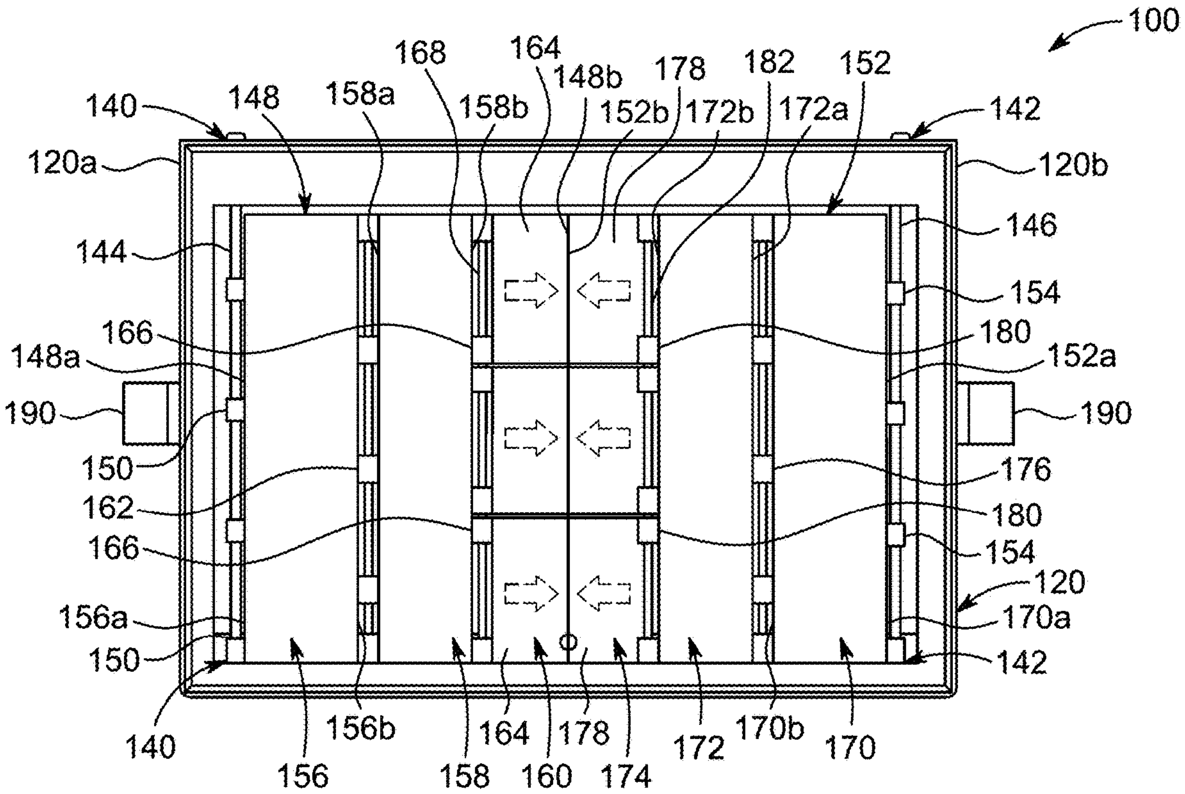
FIG. 1B is an exemplary top planar diagram of the rectangular lid, according to certain embodiments.
Figure 1C:
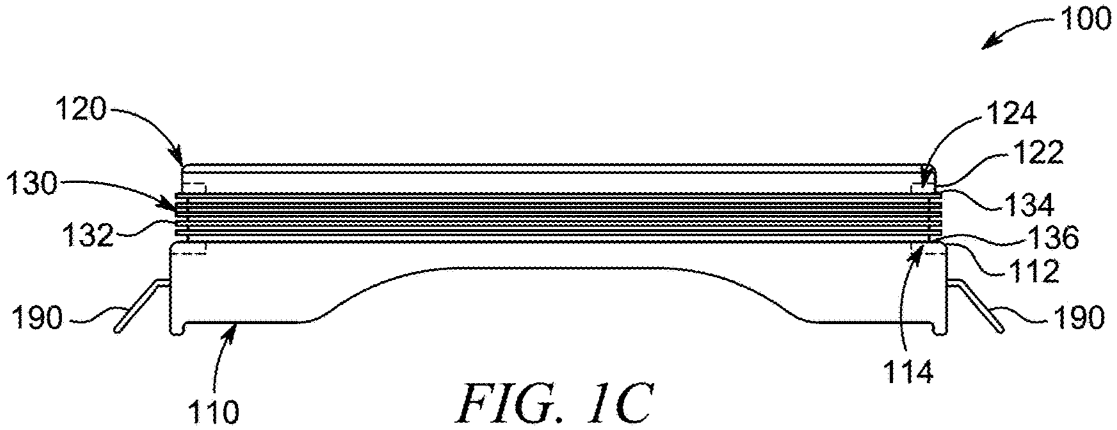
FIG. 1C is an exemplary side planar diagram of the rectangular lid, according to certain embodiments.
Figure 1D:
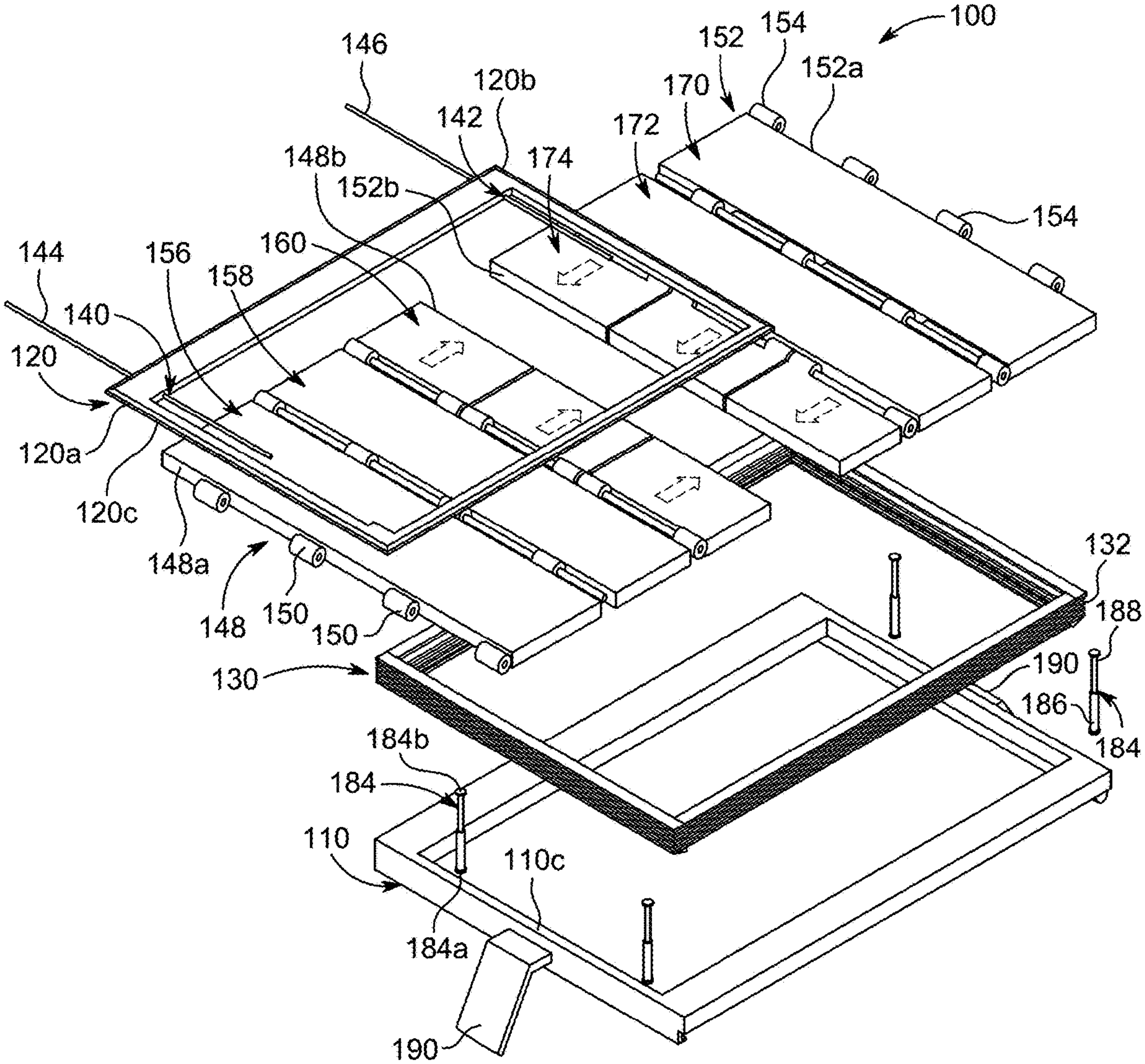
FIG. 1D is an exemplary exploded diagram of the rectangular lid, according to certain embodiments.

Referring to FIGS. 1A-1D in combination, illustrated are different views of a rectangular lid (as represented by reference numeral 100), in which FIG. 1A is an exemplary perspective diagram of the rectangular lid 100; FIG. 1B is an exemplary top planar diagram of the rectangular lid 100; FIG. 1C is an exemplary side planar diagram of the rectangular lid 100; and FIG. 1D is an exemplary exploded diagram of the rectangular lid 100. The rectangular lid 100 has a multi-component design configured to provide expandable capacity for waste disposal to a waste bin (as represented by reference numeral 300 in FIG. 3B). The rectangular lid 100 is designed to be easily attachable to and removable from the waste bin 300, facilitating cleaning and maintenance operations. The rectangular lid 100 is further designed to be retrofitted onto existing rectangular waste bins while maintaining a compact profile during normal operation.

The rectangular lid 100 is adaptable to different operational scenarios while maintaining consistent performance in outdoor environmental conditions. The rectangular lid 100 is particularly suited for residential and commercial waste management applications where varying waste volumes and collection safety are primary concerns.

As illustrated in FIGS. 1A-1D, the rectangular lid 100 includes a rectangular lower support 110 configured to attach to the waste bin, a rectangular upper support 120 comprising a disposal door (as discussed below in detail) configured to receive the waste, and a center expandable section 130 configured to attach to the rectangular lower support 110 and the rectangular upper support 120. Particularly in the rectangular lid 100, the rectangular lower support 110 and the rectangular upper support 120 are arranged in a parallel configuration, with the center expandable section 130 connecting the rectangular lower support 110 and the rectangular upper support 120. The components are generally assembled in a parallel arrangement, with the center expandable section 130 maintaining separation between the rectangular lower support 110 and the rectangular upper support 120, while simultaneously allowing for vertical expansion for the rectangular lid 100.

In an aspect, an upper opening of the waste bin 300 has a rectangular configuration and the rectangular lower support 110, the center expandable section 130, and the rectangular upper support 120 are rectangular and sized to fit over the rectangular opening of the waste bin 300. Herein, the rectangular lower support 110 has a rectangular configuration forming an inner opening. Specifically, the rectangular lower support 110 is a rectangular frame-shaped component that serves as the base of the rectangular lid 100. The rectangular lower support 110 is configured to rest on the upper opening, upon an upper rim, of the waste bin 300 to provide a stable platform. Further, the rectangular upper support 120 is configured to form the upper portion of the rectangular lid 100. For present purposes, the rectangular upper support 120 has a similar rectangular configuration to the rectangular lower support 110, forming an inner opening. Specifically, the rectangular upper support 120 is a rectangular frame-shaped component that serves as the upper platform of the rectangular lid 100.

In the present configuration, the rectangular lower support 110 is made of a rigid material, such as plastic or metal, to ensure structural integrity and durability. In an example, the rectangular lower support 110 may be manufactured from polypropylene (PP) plastic through injection molding processes to provide structural rigidity and environmental durability. Similarly, the rectangular upper support 120 is made of a rigid material, such as plastic or metal, to ensure structural integrity and durability. In an example, the rectangular upper support 120 may also be manufactured from polypropylene (PP) plastic through injection molding processes. In an exemplary configuration, the rectangular lower support 110 has outer dimensions of about 1352 millimeters in length and about 1000 millimeters in width; and the rectangular upper support 120 has outer dimensions of about 1385 millimeters in length and about 1000 millimeters in width.

The center expandable section 130 includes pleats 132 which are configured to open to permit the rectangular upper support 120 to move upward when an amount of waste within the waste bin 300 exceeds a height of the waste bin 300. The center expandable section 130 has a rectangular prismatic configuration when expanded. Herein, the pleats 132 are in the form of a series of horizontal pleats formed of a deformable material, which extend continuously around the perimeter of the center expandable section 130. In an exemplary configuration, each pleat 132 has a depth of about 5 millimeters in collapsed state, with adjacent pleats being spaced at uniform intervals of about 10 millimeters. When an amount of waste within the waste bin exceeds the height of the waste bin, the upward pressure from the excess waste causes the pleats 132 to unfold progressively, permitting the rectangular upper support 120 to move upward relative to the rectangular lower support 110.

In aspects of the present disclosure, the center expandable section 130 is made of synthetic leather. The center expandable section 130 is manufactured using synthetic leather material to provide the required combination of flexibility, durability, and environmental resistance for the rectangular lid 100. The synthetic leather material is selected based on specific physical properties including tear resistance, weather resistance, and pleating capability. In one aspect, the synthetic leather is made of polyvinyl chloride (PVC). The PVC-based synthetic leather is manufactured through a controlled layering process to achieve a thickness of about 1.2 millimeters, providing a balance between flexibility for pleating and structural integrity. The PVC-based synthetic leather may also incorporate reinforcement fiber backing to enhance durability and maintain dimensional stability during repeated expansion and contraction cycles of the center expandable section 130. In another aspect, the synthetic leather material is made of polyurethane (PU). The PU-based synthetic leather is processed to achieve similar physical characteristics, maintaining the required thickness of about 1.2 millimeters.

The center expandable section 130 is configured to attach to an outer edge 112 of the rectangular lower support 110 and to an outer edge 122 of the rectangular upper support 120, as better illustrated in FIG. 1C. The rectangular lid 100 includes a first slot 124 located around the outer edge 122 of the rectangular upper support 120. The first slot 124 extends continuously around the outer edge 122 of the rectangular upper support 120, having dimensions with a depth of approximately 5 millimeters and a width of approximately 2 millimeters to accommodate the thickness of the synthetic leather material of the center expandable section 130. The first slot 124 is configured for receiving a top edge 134 of the synthetic leather of the center expandable section 130. The top edge 134 of the synthetic leather is glued to the first slot 124 using an industrial-grade adhesive. The adhesive is applied along the entire length of the first slot 124 prior to insertion of the top edge 134 of the synthetic leather material, ensuring uniform bonding around the complete circumference of the rectangular upper support 120. Similarly, a second slot 114 is located around the outer edge 112 of the rectangular lower support 110. The second slot 114 extends continuously around the outer edge 112 of the rectangular lower support 110 with dimensions generally matching the first slot 124. The second slot 114 is configured for receiving a lower edge 136 of the synthetic leather of the center expandable section 130. The lower edge 136 of the synthetic leather is glued to the second slot 114 using the same industrial-grade adhesive as applied to the first slot 124. The adhesive is applied along the entire length of the second slot 114 prior to insertion of the lower edge 136, ensuring uniform bonding around the complete circumference of the rectangular lower support 110. It may be appreciated that the first slot 124 and the second slot 114 are manufactured during the injection molding process of the rectangular upper support 120 and the rectangular lower support 110 respectively. Further, the adhesive bond is applied to allow the pleats 132 of the center expandable section 130 to function as designed, permitting vertical expansion of the rectangular lid 100.

As better illustrated in FIGS. 1B and 1D, the rectangular lid 100 includes a first pair of opposing slots 140 located at a first end 120*a* of the rectangular upper support 120. Further, the rectangular upper support 120 includes a second pair of opposing slots 142 located at a second end 120*b* of the rectangular upper support 120. Herein, each slot of the first pair of opposing slots 140 and the second pair of opposing slots 142 extends through the thickness at the first end 120*a* and the second end 120*b*, respectively, of the rectangular upper support 120. Further, the rectangular lid 100 includes a first hinge pin 144 configured to pass through the first pair of opposing slots 140. The first hinge pin 144 has a diameter matching a diameter of the first pair of opposing slots 140 and a length sufficient to span the width of the rectangular upper support 120. The first hinge pin 144 is manufactured from stainless steel to provide durability and corrosion resistance. The rectangular lid 100 also includes a second hinge pin 146 configured to pass through the second pair of opposing slots 142. The second hinge pin 146, generally, has identical specifications to the first hinge pin 144.

The rectangular lid 100 also includes a first panel 148 having a first edge **148*a* and a second edge 148*b*. The first panel 148 is configured with a first plurality of hinges 150 located along the first edge 148*a* thereof. Herein, the first plurality of hinges 150 of the first panel 148 are configured to receive the first hinge pin 144. The rectangular lid 100 further includes a second panel 152 having a first edge 152*a* and a second edge 152*b*. The second panel 152 is configured with a first plurality of hinges 154 located along the first edge 152*a* thereof. Herein, the first plurality of hinges 154 of the second panel 152 are configured to receive the second hinge pin 146**.

In an aspect, the first plurality of hinges 150 comprises spring loaded hinges. Herein, each spring loaded hinge 150 includes a first wing and a second wing connected to a spring loaded barrel. Such configuration may be contemplated by a person skilled in the art, and thus not illustrated herein for brevity of the present disclosure. The first wing connects to the first end **120*a* of the rectangular upper support 120, while the second wing connects to an underside of the first panel 148. In the present configuration, the spring loaded barrel receives the first hinge pin 144. In an example configuration, each spring loaded hinge of the first plurality of hinges 150 has a barrel length of about 15 millimeters and a diameter of about 8 millimeters. Similarly, in aspects of the present disclosure, the first plurality of hinges 154 comprises spring loaded hinges. Herein, each spring loaded hinge 154 includes a first wing and a second wing connected to a spring loaded barrel. Such configuration may be contemplated by a person skilled in the art, and thus not illustrated herein for brevity of the present disclosure. The first wing connects to the second end 120*b* of the rectangular upper support 120, while the second wing connects to an underside of the second panel 152. In the present configuration, the spring loaded barrel receives the second hinge pin 146. The dimensional specifications and material composition of the first plurality of hinges 154 match those of the first plurality of hinges 150**. In an example configuration, each spring loaded barrel includes a torsion spring manufactured from spring steel wire with a diameter of about 1.2 millimeters. In present aspects, the torsion springs are configured to provide consistent return force through a minimum of 100,000 operation cycles. The spring load characteristics maintain consistent performance across an operating temperature range of minus 20 degrees Celsius to plus 50 degrees Celsius.

Figure 2:
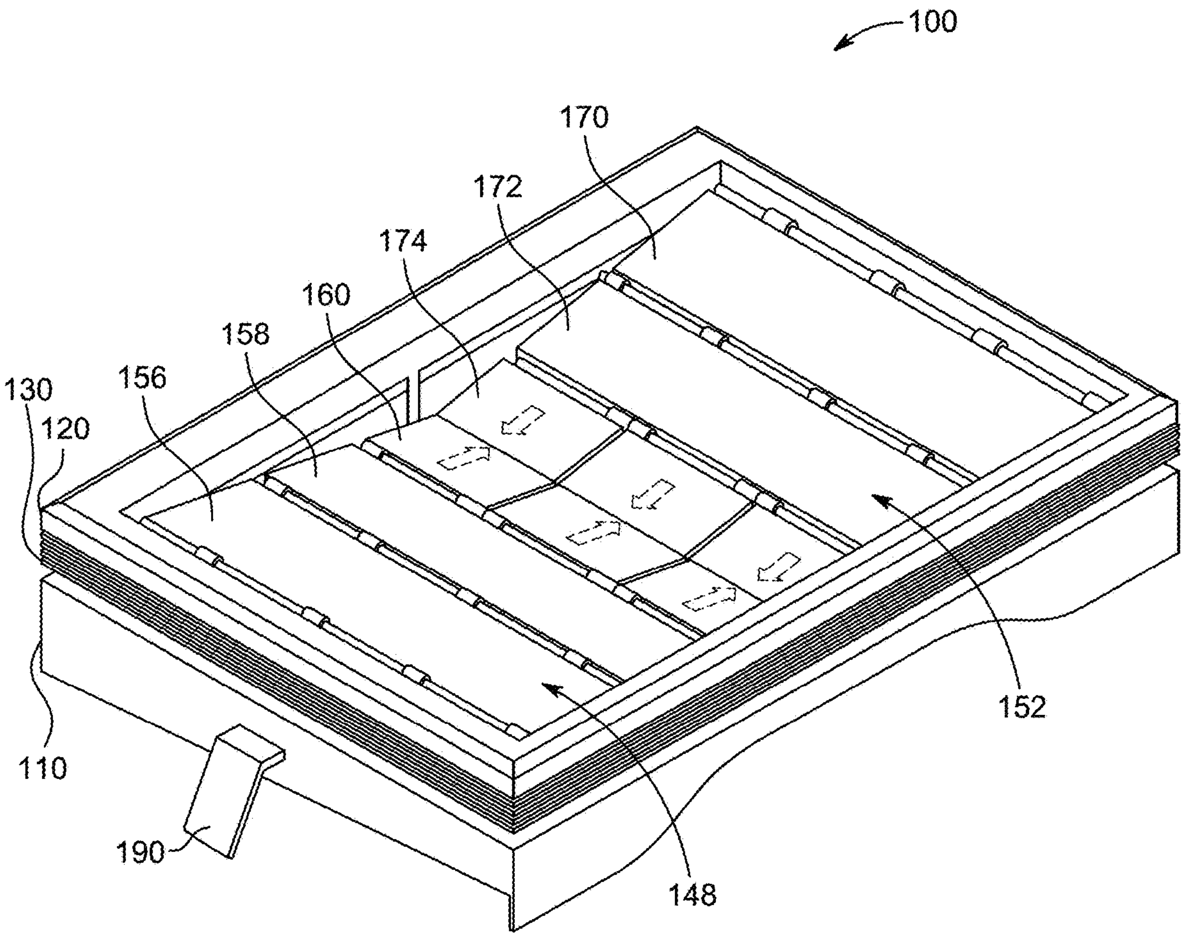
FIG. 2 is an exemplary perspective diagram of the rectangular lid in a deployed configuration thereof, according to certain embodiments.

In the rectangular lid 100, the first panel 148 and the second panel 152 are configured to form a closed disposal door in an undeployed configuration. The first panel 148 and the second panel 152 are configured as substantially planar elements, each dimensioned to cover approximately half of the disposal opening when in the undeployed configuration. In an aspect, the spring loaded hinges 150, 154 are configured to hold the first panel 148 and the second panel 152 at an angle of minus 30 degrees with respect to the rectangular upper support 120 in the undeployed configuration. Further, as illustrated in FIG. 2, the first panel 148 and the second panel 152 are further configured to rotate inward to receive the waste in a deployed configuration. Also, as illustrated in FIG. 2, when force is applied to either panel 148, 152 (e.g., due to weight of waste), the respective spring loaded hinges 150, 154 cause the panels 148, 152 to rotate inward to a position about minus 90 degrees with respect to the rectangular upper support 120 in the deployed configuration. This angular configuration ensures reliable waste containment while facilitating smooth operation during waste disposal. The first panel 148 and the second panel 152 are further configured to return to the undeployed configuration (as illustrated in FIG. 1A) after the waste is received within the waste bin 300. Herein, the spring loaded hinges 150, 154 return the first panel 148 and the second panel 152 to the undeployed configuration by a tensional force exerted within respective each spring loaded barrel. The spring loaded barrels generate a return force that automatically returns the first panel 148 and the second panel 152 to the undeployed configuration after waste passes through the disposal door. In an example, the spring loaded hinges 150, 154 are calibrated to provide a return force of about 2.5 Newton-meters, sufficient to ensure reliable closure while permitting ease of operation during waste disposal.

Further, as illustrated, the first panel 148 includes a first section 156, a second section 158 and a third section 160. In a non-limiting example, each section 156, 158, 160 has a width of about 50 centimeters and a length of about 27 centimeters. In an example, each section 156, 158, 160 is manufactured from polypropylene plastic through injection molding processes to provide structural rigidity while maintaining operational weight parameters. Specifically, as better illustrated in FIG. 1B, the first section 156 includes a first edge **156*a* and a second edge 156*b*. Herein, the first edge 156*a* of the first section 156 is the first edge 148*a* of the first panel 148 and is connected to the first plurality of hinges 150. In an example, the first section 156 has a uniform thickness of about 5 millimeters and includes reinforcement ribs extending across the width thereof to maintain structural integrity during operational cycles. The second section 158 includes a first edge 158*a* and a second edge 158*b*. The second section 158 is connected to the first section 156 by a second plurality of hinges 162. Herein, the second plurality of hinges 162 are spring loaded hinges. Each spring loaded hinge of the second plurality of hinges 162 includes a first wing and a second wing connected to a spring loaded barrel. In a non-limiting example, the spring loaded barrel has a length of about 15 millimeters and a diameter of about 8 millimeters, matching the dimensional specifications of the first plurality of hinges 150. Each first wing is connected to an underside of the second edge 156*b* of the first section 156, and each second wing is connected to an underside of the first edge 158*a* of the second section 158**.

In the present configuration, the second plurality of hinges 162 are configured to hold the second section 158 flush with the first section 156 in the undeployed configuration. When force is applied to the second section 158, the second plurality of hinges 162 permit the second section 158 to rotate inward to a position up to minus 90 degrees with respect to the rectangular upper support 120 in the deployed configuration. The second plurality of hinges 162 are further configured to return the second section 158 to the undeployed configuration by a tensional force exerted within each spring loaded barrel of the springs 162. In a non-limiting example, the spring loaded barrel of each of the second plurality of hinges 162 includes a torsion spring manufactured from spring steel wire with a diameter of about 1.2 millimeters, configured to generate a tensional force of about 2.5 Newton-meters to return the second section 158 to the undeployed configuration. The spring load characteristics maintain consistent performance through a minimum of 100,000 operation cycles across an operating temperature range of minus 20 degrees Celsius to plus 50 degrees Celsius.

Further, as illustrated, the third section 160 comprises a plurality of slides 164. In an aspect, the third section 160 includes three slides 164. In a non-limiting example, each slide 164 has a width of about 18 centimeters and a length of about 27 centimeters. In an example, each slide is manufactured through injection molding of polypropylene plastic with a uniform thickness of about 5 millimeters. The slides 164 may also include reinforcement ribs across the width to maintain structural rigidity while minimizing material mass. Each slide of the plurality of slides 164 is connected to the second edge 158*b* of the second section 158 by two spring loaded hinges 166. Each spring loaded hinge of the two spring loaded hinges 166 is configured with a first wing and a second wing connected to a spring loaded barrel. In a non-limiting example, the spring loaded barrel has a length of about 15 millimeters and a diameter of about 8 millimeters, maintaining dimensional consistency with the second plurality of hinges 162. A hinge pin 168 is configured to insert into each spring loaded barrel to connect each of the two spring loaded hinges 166. In a non-limiting example, the hinge pin 168 has a diameter of about 5.5 millimeters and is manufactured from stainless steel to ensure durability through repeated operational cycles.

The first wing of each of the two spring loaded hinges 166 is connected to an underside of the second section 158, and the second wing of each of the two spring loaded hinges 166 is connected to an underside of a respective slide of the plurality of slides 164. Specifically, the first wing of each of the two spring loaded hinges 166 is connected to the underside of the second section 158 through a mounting plate, secured by mounting screws or rivets. Further, the second wing of each of the two spring loaded hinges 166 is connected to the underside of the respective slide of the plurality of slides 164 through an identical mounting configuration. These mounting plates may be manufactured from the same polypropylene material as the sections 156, 158, 160 to maintain material compatibility and structural integrity.

Further, the two spring loaded hinges 166 are configured to hold each slide of the plurality of slides 164 flush with the second section 158 in the undeployed configuration. When force is applied to any slide of the plurality of slides 164, the two spring loaded hinges 166 permit rotation inward to a position about minus 90 degrees with respect to the rectangular upper support 120 in the deployed configuration. The two spring loaded hinges 166 are further configured to return the slide of the plurality of slides 164 to the undeployed configuration by a tensional force exerted within each spring loaded barrel. In a non-limiting example, the spring loaded barrel of each hinge includes a torsion spring manufactured from spring steel wire with a diameter of about 1.2 millimeters, calibrated to provide a return force of about 2.5 Newton-meters. This tensional force within each spring loaded barrel returns each slide to the undeployed configuration after passage of waste material.

Furthermore, as illustrated, the second panel 152 includes a first section 170, a second section 172 and a third section 174. Each section 170, 172, 174 has a width of about 50 centimeters and a length of about 27 centimeters. Each section 170, 172, 174 is manufactured from polypropylene plastic through injection molding processes to provide structural rigidity while maintaining operational weight parameters. Specifically, the first section 170 includes a first edge 170*a* and a second edge 170*b*. The first edge 170*a* of the first section 170 is the first edge 152*a* of the second panel 152 and is connected to the first plurality of hinges 154. In a non-limiting example, the first section 170 has a uniform thickness of about 5 millimeters and includes reinforcement ribs extending across the width thereof to maintain structural integrity during operational cycles. The second section 172 includes a first edge 172*a* and a second edge 172*b*. The second section 172 is connected to the first section 170 by a second plurality of hinges 176. Herein, the second plurality of hinges 176 are spring loaded hinges. Each spring loaded hinge of the second plurality of hinges 176 includes a first wing and a second wing connected to a spring loaded barrel. In an example, the spring loaded barrel has a length of about 15 millimeters and a diameter of about 8 millimeters, matching the dimensional specifications of the first plurality of hinges 154. Each first wing is connected to an underside of the second edge 170*b* of the first section 170, and each second wing is connected to an underside of the first edge 172*a* of the second section 172.

In the present configuration, the second plurality of hinges 176 are configured to hold the second section 172 flush with the first section 170 in the undeployed configuration. When force is applied to the second section 172, the second plurality of hinges 176 permit the second section 172 to rotate inward to a position about minus 90 degrees with respect to the rectangular upper support 120 in the deployed configuration. The second plurality of hinges 176 are further configured to return the second section 172 to the undeployed configuration by a tensional force exerted within each spring loaded barrel. In a non-limiting example, the spring loaded barrel of each of the second plurality of hinges 176 includes a torsion spring manufactured from spring steel wire with a diameter of about 1.2 millimeters, configured to generate a tensional force of about 2.5 Newton-meters to return the second section 172 to the undeployed configuration. The spring load characteristics maintain consistent performance through a minimum of 100,000 operation cycles across an operating temperature range of minus 20 degrees Celsius to plus 50 degrees Celsius.

Further, as illustrated, the third section 174 comprises a plurality of slides 178. In an aspect, the third section 174 includes three slides 178. Herein, each slide of the plurality of slides 178 has a width of about 18 centimeters and a length of about 27 centimeters. In an example, each slide is manufactured through injection molding of polypropylene plastic with a uniform thickness of about 5 millimeters. The slides 178 may also include reinforcement ribs across the width to maintain structural rigidity while minimizing material mass. Each slide of the plurality of slides 178 is connected to the second edge 172*b* of the second section 172 by two spring loaded hinges 180. Each spring loaded hinge of the two spring loaded hinges 180 is configured with a first wing and a second wing connected to a spring loaded barrel. In a non-limiting example, the spring loaded barrel has a length of about 15 millimeters and a diameter of about 8 millimeters, maintaining dimensional consistency with the second plurality of hinges 176. A hinge pin 182 is configured to insert into each spring loaded barrel to connect each of the two spring loaded hinges 180. The hinge pin 182 has a diameter of about 5.5 millimeters and is manufactured from stainless steel to ensure durability through repeated operational cycles.

The first wing of each of the two spring loaded hinges 180 is connected to an underside of the second section 172, and the second wing of each of the two spring loaded hinges 180 is connected to an underside of a respective slide of the plurality of slides 178. Specifically, the first wing of each of the two spring loaded hinges 180 is connected to the underside of the second section 172 through a mounting plate, secured by mounting screws or rivets. Further, the second wing of each of the two spring loaded hinges 180 is connected to the underside of the respective slide of the plurality of slides 178 through an identical mounting configuration. These mounting plates may be manufactured from the same polypropylene material as the sections 170, 172, 174 to maintain material compatibility and structural integrity.

Further, the two spring loaded hinges 180 are configured to hold each slide of the plurality of slides 178 flush with the second section 172 in the undeployed configuration. When force is applied to any slide of the plurality of slides 178, the two spring loaded hinges 180 permit rotation inward to a position up to about minus 90 degrees with respect to the rectangular upper support 120 in the deployed configuration. The two spring loaded hinges 180 are further configured to return the slide of the plurality of slides 178 to the undeployed configuration by a tensional force exerted within each spring loaded barrel. In a non-limiting example, the spring loaded barrel of each hinge includes a torsion spring manufactured from spring steel wire with a diameter of about 1.2 millimeters, calibrated to provide a return force of about 2.5 Newton-meters. This tensional force within each spring loaded barrel returns each slide to the undeployed configuration after passage of waste material.

In an aspect, as illustrated in FIG. 1D, the rectangular lid 100 further includes a plurality of telescopic supports 184 configured to connect at a first end 184*a* to a top surface 110*c* of the rectangular lower support 110 and at a second end 184*b* to a bottom surface 120*c* of the rectangular upper support 120. The plurality of telescopic supports 184 are positioned behind the center expandable section 130 in connection therewith, providing structural support while allowing for vertical expansion of the rectangular lid 100. The telescopic supports 184 are distributed along the edges of the rectangular lower support 110 and the rectangular upper support 120. In the present configuration, each telescopic support 184 is attached to the top surface 110*c* of the rectangular lower support 110 and the bottom surface 120*c* of the rectangular upper support 120 using mounting screws through pre-formed mounting points.

In particular, each telescopic support 184 includes a first cylinder 186 having a first diameter and a second cylinder 188 having a second diameter which is less than the first diameter. The second cylinder 188 is configured to nest within the first cylinder 186 when an amount of waste is below a level of the rectangular lower support 110 and to slide within the first cylinder 186 to permit the rectangular upper support 120 to move upward when an amount of waste within the waste bin exceeds a height of the waste bin. For present purposes, the first cylinder 186 and the second cylinder 188 are manufactured from polypropylene (PP) plastic through injection molding processes to provide structural rigidity and durability. In an exemplary configuration, the first cylinder 186 has an inner diameter of about 12 millimeters, while the second cylinder 188 has an outer diameter of about 11 millimeters, providing suitable clearance for telescopic movement.

Further, in the present configuration, an end of the second cylinder 188 which fits within the first cylinder 186 is configured with an inner ring protrusion (not visible), and an internal surface of a first end of the first cylinder 186 includes a jagged profile (not visible) configured to prevent the inner ring protrusion of the second cylinder 188 from moving past the first end of the first cylinder 186. Herein, the inner ring protrusion may be in the form of a continuous circular ridge formed around an inner surface of the second cylinder 188. In an example, the inner ring protrusion extends inward for about 1 millimeter. Further, the jagged profile may be in the form of a series of angled ridges formed around the internal surface of the first end of the first cylinder 186. These angled ridges of the jagged profile are configured to engage with the inner ring protrusion of the second cylinder 188. When the second cylinder 188 extends to a maximum height during expansion of the rectangular lid 100, the inner ring protrusion contacts the jagged profile, preventing separation of the second cylinder 188 from the first cylinder 186 while maintaining structural integrity of the telescopic support 184. Rotation of the second cylinder 188 within the first cylinder 186 releases the connection to the jagged profile, allowing the center expandable section 130 to be returned to the unexpanded configuration after the waste is removed from the waste bin.

In some aspects of the rectangular lid 100, as illustrated, the rectangular upper support 120 includes a handle 190. The handle 190 is connected to the rectangular upper support 120. In an exemplary configuration, handles 190 are disposed on opposite sides of the rectangular upper support 120, with each handle 190 being secured by a plurality of mounting screws. In present examples, the handles 190 may be manufactured from polypropylene (PP) plastic through injection molding processes to ensure structural integrity while maintaining ergonomic functionality.

Figure 3A:
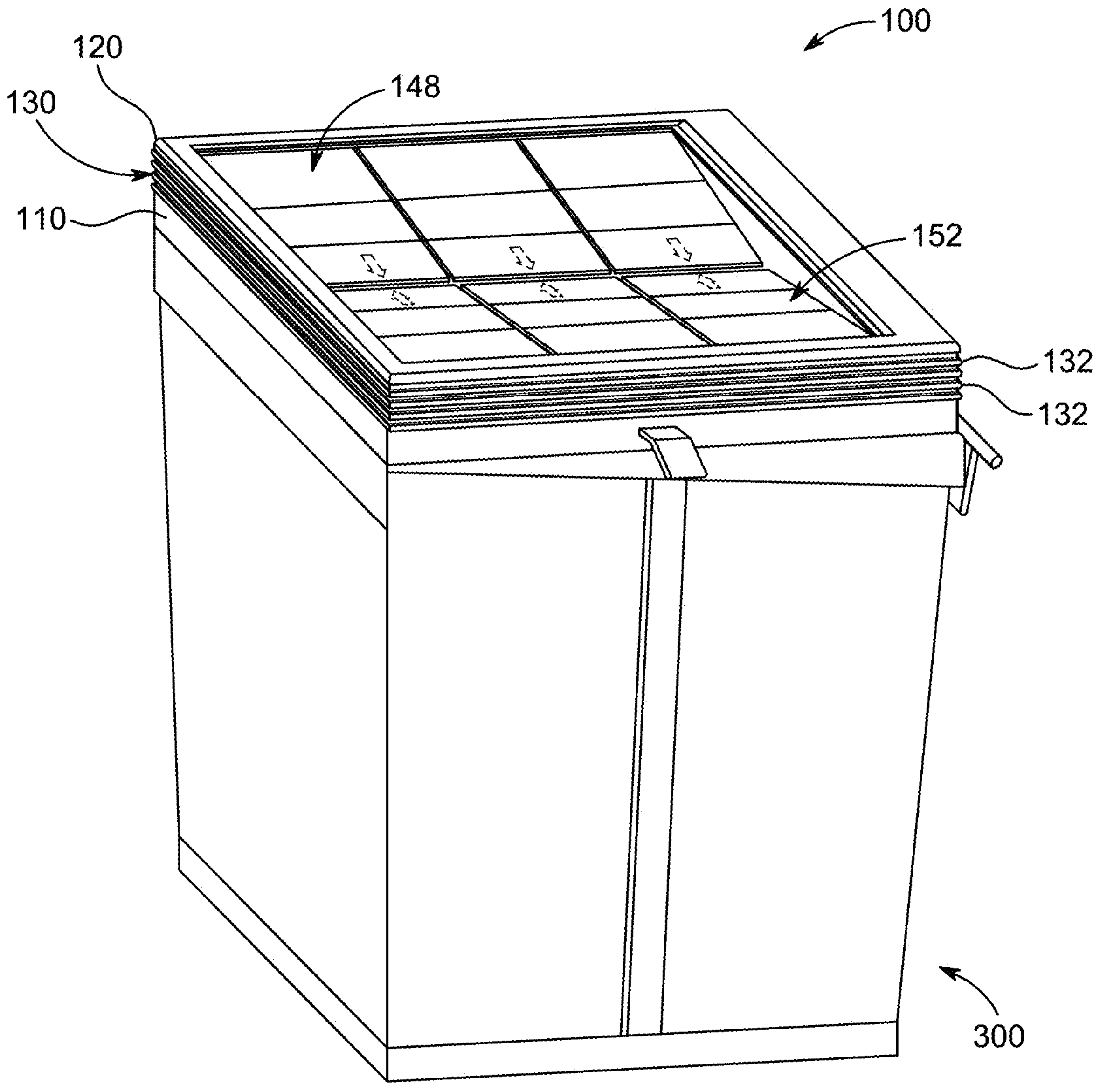
FIG. 3A is an exemplary depiction of the rectangular lid utilized with a rectangular waste bin and disposed in an undeployed configuration thereof, according to certain embodiments.
Figure 3B:
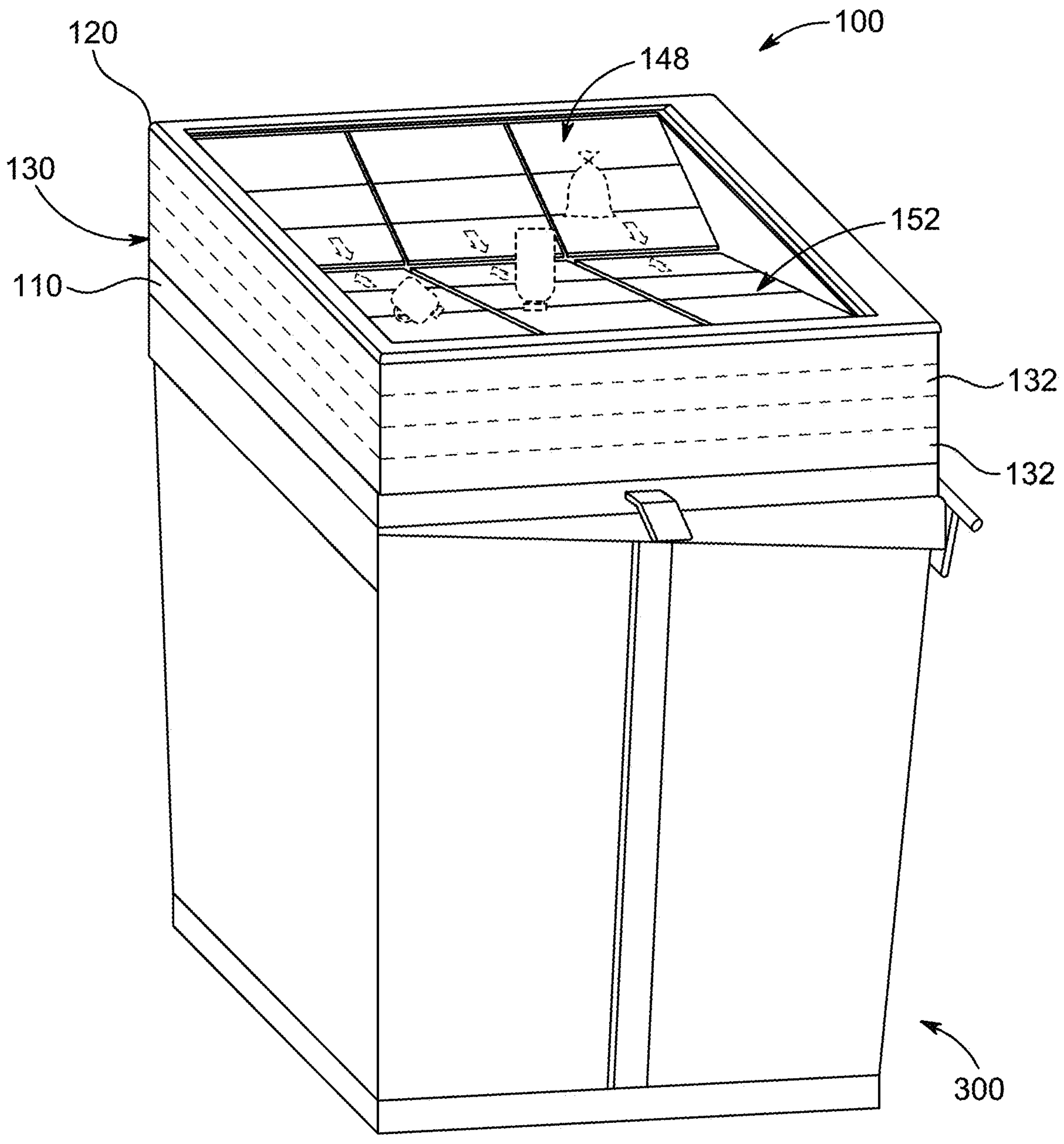
FIG. 3B is an exemplary depiction of the rectangular lid utilized with the rectangular waste bin and disposed in a deployed configuration thereof, according to certain embodiments.

In operation, with the upper opening of the waste bin 300 having a rectangular configuration, the rectangular lower support 110, the rectangular upper support 120, and the center expandable section 130 are rectangular and sized to fit over the rectangular opening of the waste bin 300. Initially, the first panel 148 and the second panel 152, in their undeployed configuration (as illustrated in FIG. 3A), form a closed disposal door that maintains a seal against odors and prevents access to inside of the waste bin 300. Upon application of downward force on either panel 148, 152 (for instance, due to weight of the waste), the spring-loaded hinges 150, 162, 166 of the first panel 148 and the spring-loaded hinges 154, 176, 180 of the second panel 152 permit controlled inward rotation to the deployed configuration (as illustrated in FIG. 3B), creating an opening for waste disposal.

Herein, the first panel 148 and the second panel 152, each comprising three distinct sections connected by spring loaded hinges, provide an opening mechanism that accommodates waste while maintaining controlled movement. For the first panel 148, the first section 156, connected by the first plurality of spring loaded hinges 150 to the rectangular upper support 120, initiates the movement. The second section 158, connected to the first section 156 by the second plurality of spring loaded hinges 162, moves in response to movement of the first section 156. The third section 160, comprising the plurality of slides 164, guides waste materials while returning to the undeployed configuration. For the second panel 152, the first section 170, connected by the first plurality of hinges 154 to the rectangular upper support 120, initiates the movement. The second section 172, connected to the first section 170 by the second plurality of spring loaded hinges 176, moves in response to movement of the first section 170. The third section 174, comprising the plurality of slides 178, guides waste materials while returning to the undeployed configuration. When an amount of waste within the waste bin 300 exceeds a height of the waste bin 300, the center expandable section 130 expands vertically. The pleats 132 of the synthetic leather material permit vertical expansion while the plurality of telescopic supports 184 maintain structural support through the range of motion. The jagged profile of the first cylinder 186 engages with the inner ring protrusion of the second cylinder 188 to control expansion while permitting movement through the extension range.

Figure 4:
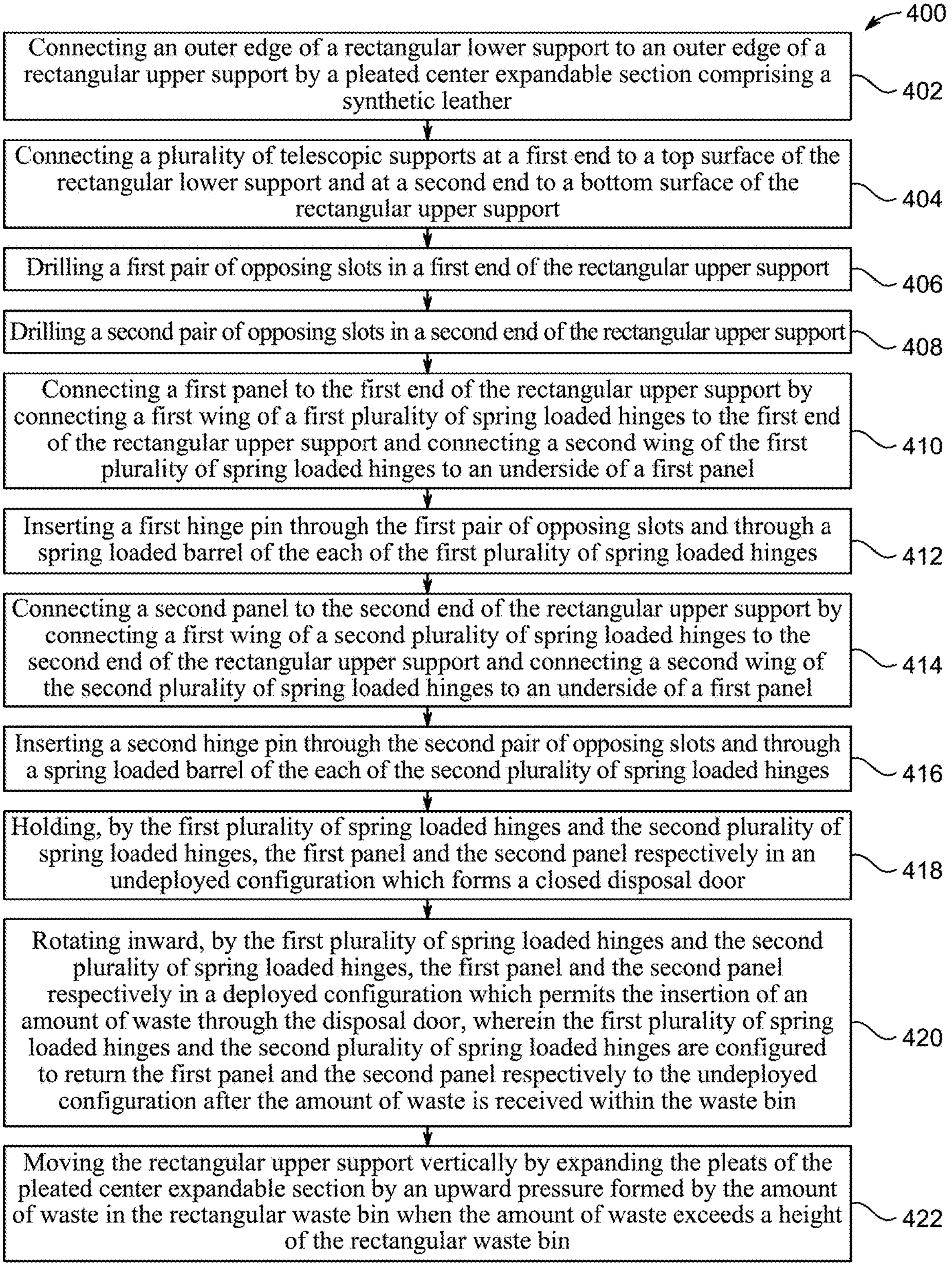
FIG. 4 is an exemplary flowchart of listing steps involved in a method for assembling the rectangular lid for a rectangular waste bin, according to certain embodiments.

Referring now to FIG. 4, the present disclosure further provides a method (as represented by a flowchart, referred by reference numeral 400) for assembling an expandable rectangular lid (same as the rectangular lid 100, with the two terms being interchangeably used hereinafter) for a rectangular waste bin 300. The method 400 includes a series of steps. These steps are only illustrative, and other alternatives may be considered where one or more steps are added, one or more steps are removed, or one or more steps are provided in a different sequence without departing from the scope of the present disclosure. Various variants disclosed above, with respect to the aforementioned rectangular lid 100 apply mutatis mutandis to the present method 400 for assembly thereof.

At step 402, the method 400 includes connecting the outer edge 112 of the rectangular lower support 110 to the outer edge 122 of the rectangular upper support 120 by the pleated center expandable section 130 comprising the synthetic leather. This involves locating the first slot 124 around the outer edge 122 of the rectangular upper support 120 and locating the second slot 114 around the outer edge 112 of the rectangular lower support 110. The first slot 124 and the second slot 114 extend continuously around the respective outer edges to accommodate the thickness of the synthetic leather material. The top edge 134 of the synthetic leather of the center expandable section 130 is inserted into the first slot 124 and glued using industrial-grade adhesive. The lower edge 136 of the synthetic leather is inserted into the second slot 114 and glued using the same industrial-grade adhesive.

At step 404, the method 400 includes connecting the plurality of telescopic supports 184 at the first end 184*a* to the top surface 110*c* of the rectangular lower support 110 and at the second end 184*b* to the bottom surface 120*c* of the rectangular upper support 120. Each telescopic support 184 includes the first cylinder 186 having a first diameter and the second cylinder 188 having a second diameter less than the first diameter. The telescopic supports 184 are attached using mounting screws through the pre-formed mounting points.

At step 406, the method 400 includes drilling the first pair of opposing slots 140 in the first end 120*a* of the rectangular upper support 120. This involves creating slots that extend through the thickness of the rectangular upper support 120. The first pair of opposing slots 140 are sized to match the diameter of the first hinge pin 144.

At step 408, the method 400 includes drilling the second pair of opposing slots 142 in the second end 120*b* of the rectangular upper support 120. This involves creating slots that extend through the thickness of the rectangular upper support 120. The second pair of opposing slots 142 are sized to match the diameter of the second hinge pin 146.

At step 410, the method 400 includes connecting the first panel 148 to the first end 120*a* of the rectangular upper support 120 by connecting the first wing of the first plurality of spring loaded hinges 150 to the first end 120*a* of the rectangular upper support 120 and connecting the second wing of the first plurality of spring loaded hinges 150 to the underside of the first panel 148. Each spring loaded hinge of the first plurality of spring loaded hinges 150 includes the spring loaded barrel, which includes the torsion spring configured to provide consistent return force for operation of the rectangular lid 100.

At step 412, the method 400 includes inserting the first hinge pin 144 through the first pair of opposing slots 140 and through the spring loaded barrel of each of the first plurality of spring loaded hinges 150. The first hinge pin 144 has a diameter matching a diameter of the first pair of opposing slots 140 and a length sufficient to span the width of the rectangular upper support 120.

At step 414, the method 400 includes connecting the second panel 152 to the second end 120*b* of the rectangular upper support 120 by connecting the first wing of the first plurality of spring loaded hinges 154 of the second panel 152 to the second end 120*b* of the rectangular upper support 120 and connecting the second wing of the first plurality of spring loaded hinges 154 of the second panel 152 to the underside of the second panel 152. Each spring loaded hinge 154 includes the first wing and the second wing connected to the spring loaded barrel. Herein, the spring loaded barrel includes a torsion spring manufactured from spring steel wire configured to generate a tensional force of about 2.5 Newton-meters.

At step 416, the method 400 includes inserting the second hinge pin 146 through the second pair of opposing slots 142 and through the spring loaded barrel of each of the first plurality of spring loaded hinges 154 of the second panel 152. The second hinge pin 146 has a diameter matching the diameter of the second pair of opposing slots 142 and a length sufficient to span the width of the rectangular upper support 120.

At step 418, the method 400 includes holding, by the first plurality of spring loaded hinges 150 of the first panel 148 and the first plurality of spring loaded hinges 154 of the second panel 152, the first panel 148 and the second panel 152 respectively in the undeployed configuration which forms the closed disposal door. In the undeployed configuration, the spring loaded hinges 150, 154 maintain the first panel 148 and the second panel 152 at an angle of minus 30 degrees with respect to the rectangular upper support 120. This configuration establishes a complete seal over the rectangular opening of the waste bin 300, preventing odor escape and unauthorized access.

At step 420, the method 400 includes rotating inward, by the first plurality of spring loaded hinges 150 of the first panel 148 and the first plurality of spring loaded hinges 154 of the second panel 152, the first panel 148 and the second panel 152 respectively in the deployed configuration. Upon application of downward force on either panel 148, 152, the respective spring loaded hinges permit controlled inward rotation to approximately minus 90 degrees with respect to the rectangular upper support 120, creating an opening for waste disposal.

Herein, the first plurality of spring loaded hinges 150 of the first panel 148 and the first plurality of spring loaded hinges 154 of the second panel 152 are configured to return the first panel 148 and the second panel 152 respectively to the undeployed configuration after the amount of waste is received within the waste bin 300. The spring loaded barrels generate a return force that automatically restores the first panel 148 and the second panel 152 to their initial minus 30-degree angle position relative to the rectangular upper support 120, re-establishing the sealed configuration of the disposal door. The spring loaded hinges 150, 154 are configured to automatically return the first panel 148 and the second panel 152 respectively to the undeployed configuration after the amount of waste passes through the disposal door and the downward force is removed.

At step 422, the method 400 includes moving the rectangular upper support 120 vertically by expanding the pleats 132 of the pleated center expandable section 130 in response to upward pressure formed by the amount of waste in the rectangular waste bin 300 when the amount of waste exceeds the height of the rectangular waste bin 300. During this vertical displacement, the second cylinder 188 of each telescopic support 184 slides within the corresponding first cylinder 186, maintaining structural alignment throughout the expansion range. The interaction between the inner ring protrusion of the second cylinder 188 and the jagged profile of the first cylinder 186 ensures controlled expansion while preventing complete separation of the telescopic components. The pleats 132 unfold progressively in response to the increasing waste volume, allowing the rectangular upper support 120 to maintain optimal operational clearance while preserving the functionality of the disposal door mechanism.

The rectangular lid 100 and the method 400 of the present disclosure provide an advancement in waste management by incorporating an expandable design. The rectangular lid 100 enables vertical expansion through the coordinated operation of the pleats 132 and the telescopic supports 184 while maintaining structural integrity and alignment. The disposal door configuration, formed by the first panel 148 and the second panel 152 with their respective spring loaded hinges, provides controlled waste disposal through a multi-section mechanism that automatically returns to the undeployed configuration. The synthetic leather construction of the center expandable section 130, combined with the spring loaded operation of the panels, ensures consistent performance across varied environmental conditions while maintaining a sealed configuration in the undeployed state.

The design of the rectangular lid 100 addresses operational challenges through several key features. The integration of the first plurality of spring loaded hinges with each panel enables precise control over the deployment angle, maintaining minus 30 degrees in the undeployed configuration and expanding to minus 90 degrees during waste disposal. The telescopic support mechanism, featuring the first cylinder 186 and second cylinder 188 with integrated expansion control, prevents structural separation while accommodating increased waste volumes. The rectangular lid 100 maintains a compact profile during normal operation while providing expandable capacity when needed, eliminating the requirement for oversized waste containers.

The implementation of the method 400 enables straightforward assembly and maintenance procedures, enhancing the practicality of the rectangular lid 100 in both residential and commercial waste management applications.

A first embodiment describes a rectangular lid 100 for a waste bin 300, comprising: a rectangular lower support 110 configured to attach to the waste bin 300; a rectangular upper support 120 comprising a disposal door configured to receive the waste; a center expandable section 130 configured to attach to the rectangular lower support 110 and the rectangular upper support 120, wherein the center expandable section 130 includes pleats 132 which are configured to open to permit the rectangular upper support 120 to move upward when an amount of waste within the waste bin 300 exceeds a height of the waste bin 300; a first pair of opposing slots 140 located at a first end **120*a* of the rectangular upper support 120; a second pair of opposing slots 142 located at a second end 120*b* of the rectangular upper support 120; a first hinge pin 144 configured to pass through the first pair of opposing slots 140; a second hinge pin 146 configured to pass through the second pair of opposing slots 142; a first panel 148 configured with a first plurality of hinges 150 located along a first edge 148*a*, wherein the first plurality of hinges 150 of the first panel 148 are configured to receive the first hinge pin 144; and a second panel 152 configured with a first plurality of hinges 154 located along a first edge 152*a*, wherein the first plurality of hinges 154 of the second panel 152 are configured to receive the second hinge pin 146, wherein the first panel 148 and the second panel 152 are configured to form a closed disposal door in an undeployed configuration and to rotate inward to receive the waste in a deployed configuration, wherein the first panel 148 and the second panel 152 are configured to return to the undeployed configuration after the waste is received within the waste bin 300. In an aspect, the first plurality of hinges 150 located along the first edge 148*a* of the first panel 148 are spring loaded hinges each configured with a first wing and a second wing connected to a spring loaded barrel, wherein the first wing is connected to the first end 120*a* of the rectangular upper support 120, the second wing is connected to an underside of the first panel 148 and the spring loaded barrel is configured to receive the first hinge pin 144, wherein the spring loaded hinges are configured to hold the first panel 148 at an angle of about minus 30 degrees with respect to the rectangular upper support 120 in the undeployed configuration, rotate inward to a position about minus 90 degrees with respect to the rectangular upper support 120 in the deployed configuration, and return the first panel 148** to the undeployed configuration by a tensional force exerted within each spring loaded barrel.

In an aspect, the first panel 148 includes a first section 156, a second section 158 and a third section 160, wherein each section has a width of about 50 cm and a length of about 27 cm.

In an aspect, the first section 156 includes a first edge **156*a* and a second edge 156*b*, wherein the first edge 156*a* of the first section 156 is the first edge 148*a* of the first panel 148 and is connected to the first plurality of hinges 150, the second section 158 is connected to the first section 156 by a second plurality of hinges 162, wherein the second plurality of hinges 162 are spring loaded hinges each configured with a first wing and a second wing connected to a spring loaded barrel, wherein each first wing is connected to an underside of the second edge 156*b* of the first section 156, and each second wing is connected to an underside of a first edge 158*a* of the second section 158, wherein the second plurality of hinges 162 are configured to hold the second section 158 flush with the first section 156 in the undeployed configuration, rotate inward to a position about minus 90 degrees with respect to the rectangular upper support 120 in the deployed configuration and return the second section 158** to the undeployed configuration by a tensional force exerted within each spring loaded barrel.

In an aspect, the rectangular lid 100 further comprises: plurality of slides 164 comprising the third section 160, wherein each slide 164 is connected to a second edge **158*b* of the second section 158 by two spring loaded hinges 166, wherein each spring loaded hinge 166 is configured with a first wing and a second wing connected to a spring loaded barrel; and a hinge pin 168 configured to insert into each spring loaded barrel to connect each of the two spring loaded hinges 166; wherein the first wing of each of the two spring loaded hinges 166 is connected to an underside of the second section 158 and the second wing of each of the two spring loaded hinges 166 is connected to an underside of a respective slide of the plurality of slides 164, wherein the two spring loaded hinges 166 are configured to hold the slide 164 flush with the second section 158 in the undeployed configuration, rotate inward to a position about minus 90 degrees with respect to the rectangular upper support 120 in the deployed configuration and return the slide 164** to the undeployed configuration by a tensional force exerted within each spring loaded barrel.

In an aspect, the third section 160 comprises three slides 164, wherein each slide 164 has a width of about 18 cm and a length of about 27 cm.

In an aspect, the first plurality of hinges 154 located along the first edge 152*a* of the second panel 152 are spring loaded hinges each configured with a first wing and a second wing connected to a spring loaded barrel, wherein the first wing is connected to the second end 120*b* of the rectangular upper support 120, the second wing is connected to an underside of the second panel 152 and the spring loaded barrel is configured to receive the second hinge pin 146, wherein the spring loaded hinges are configured to hold the second panel 152 at an angle of about minus 30 degrees with respect to the rectangular upper support 120 in the undeployed configuration, rotate inward to a position about minus 90 degrees with respect to the rectangular upper support 120 in the deployed configuration, and return the second panel 152 to the undeployed configuration by a tensional force exerted within each spring loaded barrel.

In an aspect, the second panel 152 includes a first section 170, a second section 172 and a third section 174, wherein each section has a width of about 50 cm and a length of about 27 cm. In an aspect, the first section 170 includes a first edge 170*a* and a second edge 170*b*, wherein the first edge 170*a* of the first section 170 is the first edge 152*a* of the second panel 152 and is connected to the first plurality of hinges 154, the second section 172 is connected to the first section 170 by a second plurality of hinges 176, wherein the second plurality of hinges 176 are spring loaded hinges each configured with a first wing and a second wing connected to a spring loaded barrel, wherein each first wing is connected to an underside of the second edge 170*b* of the first section 170, and each second wing is connected to an underside of a first edge 172*a* of the second section 172, wherein the second plurality of hinges 176 are configured to hold the second section 172 flush with the first section 170 in the undeployed configuration, rotate inward to a position about minus 90 degrees with respect to the rectangular upper support 120 in the deployed configuration and return the second section 172 to the undeployed configuration by a tensional force exerted within each spring loaded barrel.

In an aspect, the rectangular lid 100 further comprises: plurality of slides 178 comprising the third section 174, wherein each slide 178 is connected to a second edge 172*b* of the second section 172 by two spring loaded hinges 180, wherein each spring loaded hinge 180 is configured with a first wing and a second wing connected to a spring loaded barrel; and a hinge pin 182 configured to insert into each spring loaded barrel to connect each of the two spring loaded hinges 180, wherein the first wing of each of the two spring loaded hinges 180 is connected to an underside of the second section 172 and the second wing of each of the two spring loaded hinges 180 is connected to an underside of a respective slide of the plurality of slides 178, wherein the two spring loaded hinges 180 are configured to hold the slide 178 flush with the second section 172 in the undeployed configuration, rotate inward to a position about minus 90 degrees with respect to the rectangular upper support 120 in the deployed configuration and return the slide 178 to the undeployed configuration by a tensional force exerted within each spring loaded barrel.

In an aspect, the third section 174 comprises three slides 178, wherein each slide 178 has a width of about 18 cm and a length of about 27 cm.

In an aspect, an upper opening of the waste bin 300 has a rectangular configuration and the rectangular lower support 110, the center expandable section 130, and the rectangular upper support 120 are rectangular and sized to fit over the rectangular opening of the waste bin 300; and the rectangular upper support 120 includes a handle 190.

In an aspect, the rectangular lid 100 further comprises: a plurality of telescopic supports 184 configured to connect at a first end 184*a* to a top surface 110*c* of the rectangular lower support 110 and at a second end 184*b* to a bottom surface 120*c* of the rectangular upper support 120.

In an aspect, each telescopic support 184 includes a first cylinder 186 having a first diameter and a second cylinder 188 having a second diameter which is less than the first diameter, wherein the second cylinder 188 is configured to nest within the first cylinder 186 when an amount of waste is below a level of the rectangular lower support 110 and to slide within the first cylinder 186 to permit the rectangular upper support 120 to move upward when an amount of waste within the waste bin 300 exceeds a height of the waste bin 300.

In an aspect, an end of the second cylinder 188 which fits within the first cylinder 186 is configured with an inner ring protrusion, and an internal surface of a first end of the first cylinder 186 includes a jagged profile configured to prevent the inner ring protrusion of the second cylinder 188 from moving past the first end of the first cylinder 186.

In an aspect, the center expandable section 130 is made of synthetic leather.

In an aspect, the synthetic leather is made of polyvinyl chloride PVC.

In an aspect, the synthetic leather is made of polyurethane PU.

In an aspect, the rectangular lid 100 further comprises: a first slot 124 located around an outer edge 122 of the rectangular upper support 120, wherein the first slot 124 is configured for receiving a top edge 134 of the synthetic leather of the center expandable section 130, wherein the top edge 134 of the synthetic leather is glued to the first slot 124; and a second slot 114 around an outer edge 112 of the rectangular lower support 110, wherein the second slot 114 is configured for receiving a lower edge 136 of the synthetic leather of the center expandable section 130, wherein the lower edge 136 of the synthetic leather is glued to the second slot 114.

A second embodiment describes a method 400 for assembling an expandable rectangular lid 100 for a rectangular waste bin 300, comprising: connecting an outer edge 112 of a rectangular lower support 110 to an outer edge 122 of a rectangular upper support 120 by a pleated center expandable section 130 comprising a synthetic leather; connecting a plurality of telescopic supports 184 at a first end 184*a* to a top surface 110*c* of the rectangular lower support 110 and at a second end 184*b* to a bottom surface 120*c* of the rectangular upper support 120; drilling a first pair of opposing slots 140 in a first end 120*a* of the rectangular upper support 120; drilling a second pair of opposing slots 142 in a second end 120*b* of the rectangular upper support 120; connecting a first panel 148 to the first end 120*a* of the rectangular upper support 120 by connecting a first wing of a first plurality of spring loaded hinges 150 of the first panel 148 to the first end 120*a* of the rectangular upper support 120 and connecting a second wing of the first plurality of spring loaded hinges 150 of the first panel 148 to an underside of the first panel 148; inserting a first hinge pin 144 through the first pair of opposing slots 140 and through a spring loaded barrel of each of the first plurality of spring loaded hinges 150; connecting a second panel 152 to the second end 120*b* of the rectangular upper support 120 by connecting a first wing of a first plurality of spring loaded hinges 154 of the second panel 152 to the second end 120*b* of the rectangular upper support 120 and connecting a second wing of the first plurality of spring loaded hinges 154 of the second panel 152 to an underside of the second panel 152; inserting a second hinge pin 146 through the second pair of opposing slots 142 and through a spring loaded barrel of each of the first plurality of spring loaded hinges 154 of the second panel 152; holding, by the first plurality of spring loaded hinges 150 of the first panel 148 and the first plurality of spring loaded hinges 154 of the second panel 152, the first panel 148 and the second panel 152 respectively in an undeployed configuration which forms a closed disposal door; rotating inward, by the first plurality of spring loaded hinges 150 of the first panel 148 and the first plurality of spring loaded hinges 154 of the second panel 152, the first panel 148 and the second panel 152 respectively in a deployed configuration which permits the insertion of an amount of waste through the disposal door, wherein the first plurality of spring loaded hinges 150 of the first panel 148 and the first plurality of spring loaded hinges 154 of the second panel 152 are configured to return the first panel 148 and the second panel 152 respectively to the undeployed configuration after the amount of waste is received within the waste bin 300; and moving the rectangular upper support 120 vertically by expanding the pleats 132 of the pleated center expandable section 130 by an upward pressure formed by the amount of waste in the rectangular waste bin 300 when the amount of waste exceeds a height of the rectangular waste bin 300.

Numerous modifications and variations of the present disclosure are possible in light of the above teachings. It is therefore to be understood that within the scope of the appended claims, the invention may be practiced otherwise than as specifically described herein.

The invention claimed is:

1. A rectangular lid for a waste bin, comprising:

a rectangular lower support configured to attach to the waste bin;

a rectangular upper support comprising a disposal door configured to receive waste;

a center expandable section configured to attach to the rectangular lower support and the rectangular upper support, wherein the center expandable section includes pleats which are configured to open to permit the rectangular upper support to move upward when an amount of the waste within the waste bin exceeds a height of the waste bin;

a first pair of opposing slots located at a first end of the rectangular upper support;

a second pair of opposing slots located at a second end of the rectangular upper support;

a first hinge pin configured to pass through the first pair of opposing slots;

a second hinge pin configured to pass through the second pair of opposing slots;

a first panel configured with a first plurality of hinges located along a first edge, wherein the first plurality of hinges of the first panel are configured to receive the first hinge pin; and a second panel configured with a first plurality of hinges located along a first edge, wherein the first plurality of hinges of the second panel are configured to receive the second hinge pin, wherein the first panel and the second panel are configured to form a closed the disposal door in an undeployed configuration and to rotate inward to receive the waste in a deployed configuration, wherein the first panel and the second panel are configured to return to the undeployed configuration after the waste is received within the waste bin.

2. The rectangular lid of claim 1, wherein:

the first plurality of hinges located along the first edge of the first panel are spring loaded hinges each configured with a first wing and a second wing connected to a spring loaded barrel, wherein the first wing is connected to the first end of the rectangular upper support, the second wing is connected to an underside of the first panel and the spring loaded barrel is configured to receive the first hinge pin, wherein the spring loaded hinges are configured to hold the first panel at an angle of about minus 30 degrees with respect to the rectangular upper support in the undeployed configuration, rotate inward to a position about minus 90 degrees with respect to the rectangular upper support in the deployed configuration, and return the first panel to the undeployed configuration by a tensional force exerted within each spring loaded barrel.

3. The rectangular lid of claim 2, wherein the first panel includes a first section, a second section and a third section, wherein each section has a width of about 50 cm and a length of about 27 cm.

4. The rectangular lid of claim 3, wherein:

the first section includes a first edge and a second edge, wherein the first edge of the first section is the first edge of the first panel and is connected to the first plurality of hinges, the second section is connected to the first section by a second plurality of hinges, wherein the second plurality of hinges are spring loaded hinges each configured with a first wing and a second wing connected to a spring loaded barrel, wherein each first wing is connected to an underside of the second edge of the first section, and each second wing is connected to an underside of a first edge of the second section, wherein the second plurality of hinges are configured to hold the second section panel flush with the first section in the undeployed configuration, rotate inward to a position about minus 90 degrees with respect to the rectangular upper support in the deployed configuration and return the second section to the undeployed configuration by a tensional force exerted within each spring loaded barrel.

5. The rectangular lid of claim 4, further comprising:

plurality of slides comprising the third section, wherein each slide is connected to a second edge of the second section by two spring loaded hinges, wherein each spring loaded hinge is configured with a first wing and a second wing connected to a spring loaded barrel; and a hinge pin configured to insert into each spring loaded barrel to connect each of the two spring loaded hinges;

wherein the first wing of each of the two spring loaded hinges is connected to an underside of the second section and the second wing of each of the two spring loaded hinges is connected to an underside of a respective slide of the plurality of slides, wherein the two spring loaded hinges are configured to hold the slide flush with the second section in the undeployed configuration, rotate inward to a position about minus 90 degrees with respect to the rectangular upper support in the deployed configuration and return the slide to the undeployed configuration by a tensional force exerted within each spring loaded barrel.

6. The rectangular lid of claim 5, wherein the third section comprises three slides, wherein each slide has a width of about 18 cm and a length of about 27 cm.

7. The rectangular lid of claim 1, wherein:

the first plurality of hinges located along the first edge of the second panel are spring loaded hinges each configured with a first wing and a second wing connected to a spring loaded barrel, wherein the first wing is connected to the second end of the rectangular upper support, the second wing is connected to an underside of the first panel and the spring loaded barrel is configured to receive the second hinge pin, wherein the spring loaded hinges are configured to hold the first panel at an angle of about minus 30 degrees with respect to the rectangular upper support in the undeployed configuration, rotate inward to a position about minus 90 degrees with respect to the rectangular upper support in the deployed configuration, and return the first panel to the undeployed configuration by a tensional force exerted within each spring loaded barrel.

8. The rectangular lid of claim 7, wherein the first panel includes a first section, a second section and a third section, wherein each section has a width of about 50 cm and a length of about 27 cm.

9. The rectangular lid of claim 8, wherein:

the first section includes a first edge and a second edge, wherein the first edge of the first section is the first edge of the first panel and is connected to the first plurality of hinges, the second section is connected to the first section by a second plurality of hinges, wherein the second plurality of hinges are spring loaded hinges each configured with a first wing and a second wing connected to a spring loaded barrel, wherein each first wing is connected to an underside of the second edge of the first section, and each second wing is connected to an underside of a first edge of the second section, wherein the second plurality of hinges are configured to hold the second section panel flush with the first section in the undeployed configuration, rotate inward to a position about minus 90 degrees with respect to the rectangular upper support in the deployed configuration and return the second section to the undeployed configuration by a tensional force exerted within each spring loaded barrel.

10. The rectangular lid of claim 9, further comprising:

plurality of slides comprising the third section, wherein each slide is connected to a second edge of the second section by two spring loaded hinges, wherein each spring loaded hinge is configured with a first wing and a second wing connected to a spring loaded barrel; and a hinge pin configured to insert into each spring loaded barrel to connect each of the two spring loaded hinges, wherein the first wing of each of the two spring loaded hinges is connected to an underside of the second section and the second wing of each of the two spring loaded hinges is connected to an underside of a respective slide of the plurality of slides, wherein the two spring loaded hinges are configured to hold the slide flush with the second section in the undeployed configuration, rotate inward to a position about minus 90 degrees with respect to the rectangular upper support in the deployed configuration and return the slide to the undeployed configuration by a tensional force exerted within each spring loaded barrel.

11. The rectangular lid of claim 10, wherein the third section comprises three slides, wherein each slide has a width of about 18 cm and a length of about 27 cm.

12. The rectangular lid of claim 1, wherein:

an upper opening of the waste bin has a rectangular configuration and the rectangular lower support, the center expandable section, and the rectangular upper support are rectangular and sized to fit over the rectangular opening of the waste bin; and the rectangular upper support includes a handle.

13. The rectangular lid of claim 1, further comprising:

a plurality of telescopic supports configured to connect at a first end to a top surface of the rectangular lower support and at a second end to an undersurface of the rectangular upper support.

14. The rectangular lid of claim 13, wherein each telescopic support includes a first cylinder having a first diameter and a second cylinder having a second diameter which is less than the first diameter, wherein the second cylinder is configured to nest within the first cylinder when an amount of waste is below a level of the rectangular lower support and to slide within the first cylinder to permit the rectangular upper support to move upward when an amount of waste within the waste bin exceeds a height of the waste bin.

15. The rectangular lid of claim 14, wherein:

an end of the second cylinder which fits within the first cylinder is configured with an inner ring protrusion, and an internal surface of a first end of the first cylinder includes a jagged profile configured to prevent the inner ring protrusion of the second cylinder from moving past the first end of the first cylinder.

16. The rectangular lid of claim 1, wherein the center expandable section is made of synthetic leather.

17. The rectangular lid of claim 16, wherein the synthetic leather is made of polyvinyl chloride.

18. The rectangular lid of claim 16, wherein the synthetic leather is made of polyurethane.

19. The rectangular lid of claim 16, further comprising:

a first slot located around an outer edge of the rectangular upper support, wherein the first slot is configured for receiving a top edge of the synthetic leather of the center expandable section, wherein the top edge of the synthetic leather is glued to the first slot; and a second slot around an outer edge of the rectangular lower support, wherein the second slot is configured for receiving a lower edge of the synthetic leather of the center expandable section, wherein the lower edge of the synthetic leather is glued to the second slot.

20. A method for assembling an expandable rectangular lid for a rectangular waste bin, comprising:

connecting an outer edge of a rectangular lower support to an outer edge of a rectangular upper support by a pleated center expandable section comprising a synthetic leather;

connecting a plurality of telescopic supports at a first end to a top surface of the rectangular lower support and at a second end to a bottom surface of the rectangular upper support;

drilling a first pair of opposing slots in a first end of the rectangular upper support;

drilling a second pair of opposing slots in a second end of the rectangular upper support;

connecting a first panel to the first end of the rectangular upper support by connecting a first wing of a first plurality of spring loaded hinges of the first panel to the first end of the rectangular upper support and connecting a second wing of the first plurality of spring loaded hinges of the first panel to an underside of the first panel;

inserting a first hinge pin through the first pair of opposing slots and through a spring loaded barrel of the each of the first plurality of spring loaded hinges;

connecting a second panel to the second end of the rectangular upper support by connecting a first wing of a first plurality of spring loaded hinges of the second panel to the second end of the rectangular upper support and connecting a second wing of the first plurality of spring loaded hinges of the second panel to an underside of the second panel;

inserting a second hinge pin through the second pair of opposing slots and through a spring loaded barrel of the each of the first plurality of spring loaded hinges of the second panel;

holding, by the first plurality of spring loaded hinges of the first panel and a second plurality of spring loaded hinges of the second panel, the first panel and the second panel respectively in an undeployed configuration which forms a closed disposal door;

rotating inward, by the first plurality of spring loaded hinges of the first panel and the second plurality of spring loaded hinges of the second panel, the first panel and the second panel respectively in a deployed configuration which permits the insertion of an amount of waste through the disposal door, wherein the first plurality of spring loaded hinges of the first panel and the second plurality of spring loaded hinges of the second panel are configured to return the first panel and the second panel respectively to the undeployed configuration after the amount of waste is received within the waste bin; and moving the rectangular upper support vertically by expanding the pleats of the pleated center expandable section by an upward pressure formed by the amount of waste in the rectangular waste bin when the amount of waste exceeds a height of the rectangular waste bin.

* * * * *